United States Patent Office 3,644,522
Patented Feb. 22, 1972

3,644,522
CATALYTIC HYDROGENATION OF NITROGEN CONTAINING COMPOUNDS OVER SUPPORTED RUTHENIUM CATALYSTS
Loren D. Brake and Alvin B. Stiles, Wilmington, Del., assignors to E. I. du Pont de Nemours and Company, Wilmington, Del.
No Drawing. Continuation-in-part of application Ser. No. 691,954, Dec. 20, 1967, which is a continuation-in-part of application Ser. No. 588,011, Oct. 20, 1966, which in turn is a continuation-in-part of application Ser. No. 516,108, Dec. 23, 1965. This application is also a continuation-in-part of application Ser. No. 588,011, Oct. 20, 1966, which is a continuation-in-part of application Ser. No. 516,108, Dec. 23, 1965. This application is also a continuation-in-part of application Ser. No. 691,979, Dec. 20, 1967, which is a continuation-in-part of application Ser. No. 587,982, Oct. 20, 1966, which in turn is a continuation-in-part of application Ser. No. 516,140, Dec. 23, 1965. This application is also a continuation-in-part of application Ser. No. 587,982, Oct. 20, 1966, which is a continuation-in-part of application Ser. No. 516,140, Dec. 23, 1965. This application Apr. 4, 1969, Ser. No. 813,752
Int. Cl. C07c 85/14
U.S. Cl. 260—563 D                          13 Claims

ABSTRACT OF THE DISCLOSURE

Organic aromatic nitrogen containing compounds, such as p-phenylenediamine or 4,4'-methylenedianiline, can be hydrogenated by admixing the compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200% by weight, based on the weight of the compound to be hydrogenated, of added ammonia, and in the presence of from 0.001% to 10% by weight, based on the compound to be hydrogenated and calculated as metallic ruthenium, of a ruthenium catalyst supported on an inert carrier selected from the group consisting of calcium carbonate, rare earth oxides, rare earth carbonates, mixed rare earth oxide-carbonates, and mixtures thereof.

CROSS REFERENCES TO OTHER APPLICATIONS

This application is a continuation-in-part of Ser. No. 691,954 filed Dec. 20, 1967, now abandoned, which is in turn a continuation-in-part of Ser. No. 588,011, filed Oct. 20, 1966, now abandoned, which is in turn a continuation-in-part of Ser. No. 516,108 filed Dec. 23, 1965, now abandoned.

This application is also a continuation-in-part of Ser. No. 588,011 filed Oct. 20, 1966, now abandoned, which is in turn a continuation-in-part of Ser. No. 516,108, filed Dec. 23, 1965, now abandoned.

This application is a continuation-in-part of Ser. No. 691,979 filed Dec. 20, 1967, now abandoned, which is in turn a continuation-in-part of Ser. No. 587,982, filed Oct. 20, 1966, now abandoned, which is in turn a continuation-in-part of Ser. No. 516,140, filed Dec. 23, 1965, now abandoned.

This application is also a continuation-in-part of Ser. No. 587,982, filed Oct. 20, 1966, now abandoned, which is in turn a continuation-in-part of Ser. No. 516,140, filed Dec. 23, 1965, now abandoned.

BACKGROUND OF THE INVENTION

This invention relates to a method of hydrogenating aromatic nitrogen containing compounds by heating the compound in the presence of hydrogen, the presence or absence of added ammonia, and the presence of a ruthenium catalyst supported on an inert carrier selected from the group consisting of calcium carbonate, rare earth oxides, rare earth carbonates, mixed rare earth oxide-carbonates, and mixtures thereof. By this method the aromatic compound is converted to the corresponding saturated compound.

Various methods are known in the art for hydrogenating aromatic nitrogen containing compounds such as those disclosed in the following U.S. Patents: 2,606,925 to Whitman; 2,606,926 to Kirby; 2,606,928 to Barkdoll et al.; 2,822,392 to Illich et al. While the processes in the above mentioned references have worked in the past, they tend to be unsatisfactory because of low yields and the production of by-product tars and condensation or deamination products produced when amine groups are split off during hydrogenation or as in the case of U.S. Pat. 3,347,917, they require the use of ammonia to get good yields. The use of ammonia is more costly requiring special facilities for the addition and recovery of ammonia.

This invention also relates to a method for hydrogenating 4,4'-methylenedianiline hereinafter referred to as MDA, by heating it under hydrogen pressure in the presence of a ruthenium catalyst supported on an inert carrier selected from the group consisting of calcium carbonate, rare earth oxides, rare earth carbonates, mixed rare earth oxide-carbonates, and mixtures thereof. By this method the coresponding 4,4'-methylene-di(cyclohexylamine) is obtained in good yield with very little contamination from by-product tars and condensation or deamination products.

The various methods known to the art for preparing 4,4'-methylenedi(cyclohexylamine), hereinafter referred to as PACM, produce a variety of mixtures of the three stereoisomeric forms, commonly referred to as the cis,-cis-, cis,trans- and trans,trans-stereoisomers.

PACM can be used for the preparation of polyamides by reacting it with a polycarboxylic acid such as sebacic acid. The stereoisomeric composition of the PACM used will determine some of the properties of the polyamide to be formed. To obtain a polyamide with properties derived from the trans,transisomer of PACM it is necessary to have as a starting material a PACM composition of high trans,trans-isomer content.

The processes previously described have the limitation that when long reaction times are used, decomposition products such as tars are increased and catalyst life is markedly reduced. Under the hydrogenation conditions of this invention, decomposition and condensation by-products (tars) are minimized and conversion to the desired products is markedly improved.

A process has been discovered for saturating aromatic nitrogen containing compounds, particularly MDA. The process is characterized by the formation of very little tars, decomposition products, or condensation products. The process can be run repeatedly or continuously for extended periods, with good yields of desired product without catalyst rejuvenation.

SUMMARY OF THE INVENTION

This invention is directed to a process for hydrogenating aromatic nitrogen containing compounds having the folloing formulae:

(I) 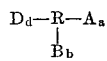

(II) 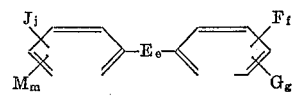

(III) 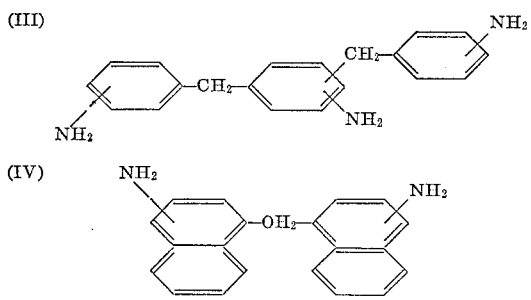

(IV)

and (V) 

wherein:

R is benzene, naphthalene, anthracene, or fluorene;
X is pyridine, quinoline, or indole;
A is

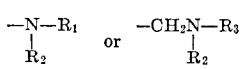

B is —$NH_2$, alkyl having 1 to 12 carbon atoms, or alkoxy having 1 to 5 carbon atoms;
D is alkyl having 1 to 12 carbon atoms, —$NH_2$, alkoxy having 1 to 5 carbon atoms, —OH, or cyano;
E is —$CH_2$—, —$CH_2CH_2$—, or —O—,
F is

or —$CH_2NH_2$;

G is —$NH_2$ or alkyl having 1 to 12 carbon atoms;
J is

or —$CH_2NH_2$;
M is —$NH_2$ or alkyl having 1 to 12 carbon atoms;
Q is —$NH_2$ or alkyl having 1 to 12 carbon atoms;
T is —$NH_2$ or alkyl having 1 to 12 carbon atoms;
$R_1$ is hydrogen or alkyl having 1 to 12 carbon atoms;
$R_2$ is hydrogen, alkyl having 1 to 12 carbon atoms, benzyl, cyclohexyl, or phenyl;
$R_3$ is hydrogen or alkyl having 1 to 12 carbon atoms;
$R_4$, $R_5$, $R_6$ and $R_7$ are the same or different and are selected from hydrogen or alkyl having 1 to 12 carbon atoms;
$a$ is an integer selected from 1 or 2, with the proviso that when $a$ is 2, the A groups may be the same or different; and
$b$, $d$, $e$, $f$, $g$, $j$, $m$, $q$, and $t$ are the same or different and are integers selected from 0 or 1 with the proviso that at least one of $f$, $g$, $j$ or $m$ be 1;

with the provisos that:

(1) compounds having Formulae I and V can contain no more than 30 carbon atoms and
(2) compounds having Formula II can contain no more than 36 carbon atoms;

comprising admixing said compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200%, by weight, based on the weight of said compound to be hydrogenated, of added ammonia, and in the presence of from 0.001% to 10% by weight, based on said compound to be hydrogenated and calculated as metallic ruthenium, of a ruthenium catalyst supported on an inert carrier selected from the group consisting of calcium carbonate, rare earth oxides, rare earth carbonates, mixed rare earth oxide-carbonates, and mixtures thereof.

The preferred group of aromatic nitrogen containing compounds are those having the formulae:

(VI) 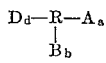

(VII) 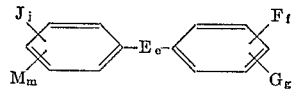

(VIII) 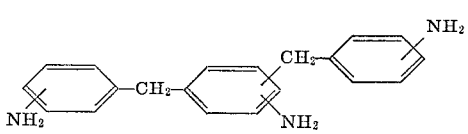

and (IX) 

wherein:

R is benzene, naphthalene, anthracene, or fluorene;
X is pyridine, quinoline, or indole;
A is —$NH_2$ or —$CH_2NH_2$;
B is —$NH_2$, alkyl having 1 to 12 carbon atoms, or alkoxy having 1 to 5 carbon atoms;
D is alkyl having 1 to 12 carbon atoms, or alkoxy having 1 to 5 carbon atoms;
E is —$CH_2$— or —$CH_2CH_2$—;
F is —$NH_2$ or —$CH_2NH_2$;
G is alkyl having 1 to 12 carbon atoms;
J is —$NH_2$ or —$CH_2NH_2$;
M is alkyl having 1 to 12 carbon atoms;
Q is —$NH_2$ or alkyl having 1 to 12 carbon atoms;
T is alkyl having 1 to 12 carbon atoms;
$a$ is 1;
$b$, $d$, $e$, $f$, $g$, $j$, $m$, $q$, and $t$ are the same or different and are integers selected from 0 to 1 with the proviso that at least one of $f$, $g$, $j$ or $m$ be 1.

Most preferred are the aromatic nitrogen containing compounds of the following formulae:

(X) 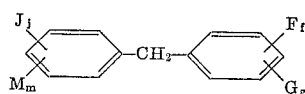

and (XI) 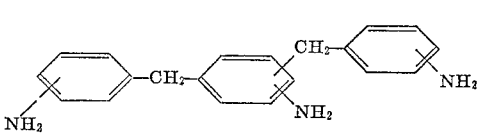

wherein:

F is —$NH_2$ or —$CH_2NH_2$;
J is —$NH_2$ or —$CH_2NH_2$;
G is alkyl of 1 to 4 carbon atoms;
M is alkyl of 1 to 4 carbon atoms;
$f$, $g$, $j$ and $m$ are the same or different and are integers selected from 0 to 1 with the proviso that at least one of $f$, $g$, $j$ or $m$ be 1.

Surprisingly, this process attains good conversions in good yields in reaction times of less than about 60 minutes. In some instances saturation can be obtained in as short a time as 1 to 30 minutes. This process produces minimal amounts of unwanted by-product tars or residues. When MDA is used in the present process, PACM is produced in less than 60 minutes, and even in as short a time as 1 minute, with yields of from 94 to 98% and higher of a PACM isomer mixture containing very little by-product tars and condensation or deamination products. Event more surprisingly, the process of this invention can include a hold period, after saturation is essentially complete, during which the PACM product is isomerized to a ratio of isomers approaching equilibrium ratio without excessive by-product formation.

DESCRIPTION OF THE INVENTION

The general conditions used to hydrogenate aromatic nitrogen containing compounds according to the present process are those which have generally been used and are described for example in the Whitman patent already mentioned. The critical difference between the present process and prior art processes lie in the use of the specific support materials hereinabove listed.

THE CATALYST

The catalyst used in the hydrogenation process of this invention is a ruthenium catalyst supported on an inert carrier selected from the group consisting of calcium carbonate, rare earth oxides, rare earth carbonates, mixed rare earth oxide-carbonates, and mixtures thereof. Illustrative of the rare earth oxides which can be used as carriers are cerium, lanthanum and praseodymium. Suitable rare earth carbonates are cerium, lanthanum and praseodymium. The mixed oxide-carbonates carriers can be mixed oxide-carbonates of the rare earth metals such as lanthanum, cerium, praseodymium, neodymium, promethium, samarium, europium, gadolinium, terbium, dysprosium, holmium, yttrium, erbium, thulium, ytterbium and lutetium. Ordinarily, the rare earth oxides contain a significant proportion of rare earth carbonates when the oxides are prepared from the carbonates.

The supported catalysts can be prepared by slurrying the carrier material in an aqueous ruthenium chloride solution, precipitating the ruthenium values with aqueous ammonium bicarbonate, digesting at 60–90° C., filtering, washing, drying and activating by means well known in the art. Other means for preparing the catalysts will be obvious to those skilled in the art. Methods of preparing extended catalysts on single and mixed rare earth oxides, carbonates, and oxide-carbonates are fully explained in U.S. application Ser. No. 516,106, filed Dec. 23, 1965 now U.S. Pat. 3,404,098 issued Oct. 1, 1968.

The amount of ruthenium catalyst used will be at least 0.001% by weight of the compound to be hydrogenated, calculated as metallic ruthenium. The catalyst can be used in amounts of up to 10% or more, but little practical advantage is gained from the use of larger amounts. Preferably, from about 0.01 to 1.0% by weight of catalyst, calculated as metallic ruthenium, will give desired reactions at reasonable cost.

PROCESS CONDITIONS

The temperature used in the process of this invention will be in the range of from about 100° to 300° C., and for most compounds it is preferably about 180° to 220° C. When MDA is hydrogenated, the preferred temperature range is from about 150° C. to about 275° C. and the most preferred temperature range is from 180 to 245° C.

The process is run at hydrogen partial pressure above about 200 p.s.i., and ordinarily between about 2000 and 5500 p.s.i. Higher hydrogen partial pressures can be used if desired but little practical advantage is obtained. The total pressure during hydrogenation will ordinarily be above 200 p.s.i. and can be as high as 15,000 p.s.i., a practical upper limit for reasons of cost of operation and equipment.

The process of this invention can be run in the presence or absence of a solvent. In the case of aromatic amines with melting points greater than 100° C., the use of a solvent is often desirable to simplify processing. The most desirable solvent is the hydrogenation product itself. It is preferred to employ no solvent. When a solvent is used, a liquid not subject to hydrogenation under the process conditions should be employed. Representative of the suitable solvents are saturated aliphatic and alicyclic hydrocarbons, such as n-hexane, cyclohexane, and cyclooctane; low molecular weight alcohols, such as methyl alcohol, ethyl alcohol, isopropyl alcohol, n-butanol, and preferably aliphatic and alicyclic hydrocarbon ethers, such as n-propyl ether, n-butyl ether, ethyl ether, isopropyl ether, isobutyl ether, the amyl ethers, tetrahydrofuran, dioxane, and dicyclohexylether. Water can be used as a solvent. Mixtures of two or more of the above solvents are also suitable.

When a solvent is used, it can be used in concentrations as low as about 0.2 part of solvent per part of starting compound introduced into the reaction. However, amounts of solvent from about 25% to 150% of the weight of starting compound will normally be used. Greater amounts of solvent can of course be used, even as high as 1000% to 2000% based on the starting compound, but such amounts merely dilute the components in the reaction mass with no particular advantages obtained. When MDA is hydrogenated, preferably from about 0.4 to about 1.0 part of solvent for each part of amine is used.

The description of the process of this invention has been directed principally to a batch process. However, as will be understood by those skilled in the art, the process can be operated continuously. The variables and factors involved in the batch process can, by routine calculation, be converted to a continuous process. The relationships between batch and continuous reaction systems are described in detail in such references as O. Levenspiel, Chemical Reaction Engineering, John Wiley (1962), and H. Krames et al., Chemical Reactor Design and Operation, Academic Press (1963). The reaction times disclosed in the examples are applicable to continuous reactor systems only if there is no back mixing of products with reactants. As is known by those skilled in the art, continuous systems in which back mixing is employed require longer reaction times to accomplish equivalent degrees of conversion, except for reactions whose rates are independent of reactant concentration. It will also be apparent to those skilled in the art that in a continuous process being operated in a thoroughly back-mixed fashion, the quantity of catalyst to be used, though still within the previously described range, will be calculated on the basis of total reactor content rather than the initial charge as is done in batch process.

OPTIONAL USE OF AMMONIA

The compounds which can be hydrogenated in the process of this invention can be classified in two broad groups, characterized in that the hydrogenation of compounds of one of the groups, hereinafter called Group A, the presence of added ammonia is optional in that no readily observable benefit is obtained by the presence of ammonia. However, failure to observe improved results when ammonia is present during hydrogenation of the latter group could be due merely to the outstanding results obtainable in the absence of ammonia which makes experimental determination of additional improvement extremely difficult. The aromatic nitrogen containing compounds falling within Group A are those having the formulae:

(XII) 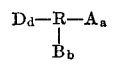

(XIII) 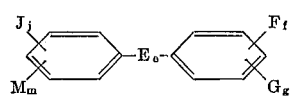

(XIV) 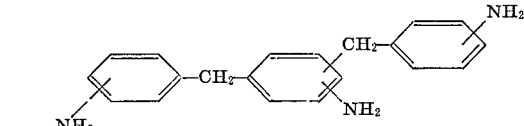

(XV) 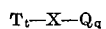

wherein:

R is benzene, naphthalene, anthracene, or fluorene;
X is pyridine, quinoline, or indole;
A is —NH₂ or —CH₂NH₂;

B is —NH₂, alkyl having 1 to 12 carbon atoms, or alkoxy having 1 to 5 carbon atoms;
D is alkyl having 1–12 carbon atoms, alkoxy having 1–5 carbon atoms, or —OH;
E is —CH₂—, —CH₂CH₂—, or —O—;
F is —NH₂ or —CH₂NH₂;
G is alkyl having 1–12 carbon atoms;
J is —NH₂ or —CH₂NH₂;
M is alkyl having 1–12 carbon atoms;
Q is —NH₂ or alkyl having 1–12 carbon atoms;
T is alkyl having 1–12 carbon atoms;
a is 1;
b, d, e, f, g, j, m, q, and t are the same or different and are integers selected from 0 to 1 with the proviso that at least one of f, g, j or m be 1.

Hydrogenation of compounds of Group A can be conducted in the presence or absence of added ammonia. If ammonia is used it can be used in amounts up to 200% or more based on the weight of the compound to be hydrogenated. In fact, it appears that there is no upper limit to the amount of ammonia which can be present without deleterious effect on the process.

The hydrogenation of the aromatic nitrogen containing compounds which are within the scope of Formulae I through V but not within the scope of Group A, is materially improved by the presence of ammonia in the reaction system. This latter group of compounds will be referred to as Group B. While it is not necessary to hydrogenate the compounds of Group B in the presence of ammonia, it is preferable that the hydrogenation of said compounds be conducted in the presence of amounts of ammonia of from less than 1 to about 200% based on the weight of the compound to be hydrogenated. Amounts of 5 to 40% are preferred. However, there appears to be no upper limit to the amount of ammonia which can be present without deleterious effect on the process. Amounts as high as 400% and higher can be used.

When MDA is hydrogenated, from about 1 to more than 100% by weight of ammonia, based on the weight of MDA, can be used in this process. However, since the use of ammonia imparts little or no observable benefit in the hydrogenation of MDA, the process will normally be operated in the absence of added ammonia.

ILLUSTRATIONS OF SUITABLE AMINES

The compounds which can be hydrogenated according to the process of this invention are generally those shown in Formulae I through V shown above. Representative of such compounds are:

Aniline,
2-ethylaniline,
N-ethyl-N-methylaniline,
N,N-dimethylaniline,
2,4-diamino-N-phenylaniline,
o, m, and p-Phenylenediamine,
2,4-diaminotoluene,
1,2,4,5-tetraaminobenzene,
4-methoxy-m-phenylenediamine,
4-amino-m-cresol,
4-amino-2,5-xylenol,
4-amino-N-phenylaniline,
2-amino-N-methylaniline,
2-methoxy-5-methylaniline,
o, m, and p-Aminobenzonitrile,
N-methylaniline,
o, m, and p-Toluidine,
N-isobutyl-p-phenylenediamine,
o, m, and p-Xylylenediamine,
o, m, and p-Anisidine,
N-isoamyl-p-phenylenediamine,
N-benzyl-p-phenylenediamine,
N-cyclohexyl-p-phenylenediamine,
N,N'-di(n-propyl)-p-phenylenediamine,
N-(n-butyl)-N'-benzyl-p-phenylenediamine,
N,N'-dibenzyl-p-phenylenediamine,
N-ethyl-m-phenylenediamine,
N-methyl-m-phenylenediamine,
N-ethyl-o-phenylenediamine,
N,N-diethyl-p-phenylenediamine,
N-methyl-N-(n-propyl)-p-phenylenediamine,
N-(p-aminophenyl)piperidine,
Benzylamine,
N-isopropylaniline,
N-ethyl-o-toluidine,
N-ethyl-m-toluidine,
N-ethyl-N-benzyl-m-toluidine,
p-(N,N-dimethylamino)benzylamine,
N-phenylbenzylamine,
N,N-dimethylbenzylamine,
N-ethyl-N-phenylbenzylamine,
N-phenyl-p-phenylenediamine,
1-amino-naphthalene,
1-(aminomethyl)-2-hydroxynaphthalene,
N-ethyl-1-aminonaphthalene,
N-decyl-1-aminonaphthalene,
N-phenyl-1-aminonaphthalene,
1,5-diaminonaphthalene,
Pyridine,
3-aminopyridine,
2-amino-4,6-dimethylpyridine
2,4-dimethylpyridine,
2,6-diaminopyridine,
2-amino-5-methylpyridine,
2-(2-aminoethyl)pyridine,
2-aminopyridine,
4,4'-methylenedianiline,
Benzidine,
Tolidine,
4,4'-methylenedi(1-naphthylamine),
4,4'-oxydianiline,
4,4'-ethylenedianiline,
4,4'-methylenebis(3-methoxyaniline),
4,4'-methylenedibenzylamine,
4,4'-methylenebis(N-ethyl-o-toluidine),
2,4-bis(4-aminobenzyl)aniline,
4,4'-methylenebis(N,N-dimethylaniline),
4,4'-methylenebis(N-methylaniline),
N,N,N',N'-tetramethylbenzidine,
Bis(3,4-diaminophenyl)methane,
2-aminofluorene,
Bis(3-methyl-4-aminophenyl)methane,
2,7-diaminofluorene,
2-aminofluorene,
3-aminoquinoline,
8-aminoquinoline,
5-aminoindole,
3-[(dimethylamino)methyl]indole,
1-aminoanthracene,
2-aminoanthracene.

The preferred amines are: o, m, and p-phenylenediamine, o, m, and p-toluidine, 4,4'-methylenedianiline, benzidine, and 2,4-bis(4-aminobenzyl)aniline.

The most preferred amine is 4,4'-methylenedianiline.

EXAMPLES

This invention will be better understood by reference to the following illustrative examples wherein parts and percentages are by weight unless otherwise specified.

Example 1

In a 400 cc. agitated pressure vessel, at a temperature of 225° C. and a hydrogen pressure of 5000 p.s.i.g., 150 parts of 4,4'-methylenedianiline is subjected to hydrogenation utilizing 10 parts of a finely divided catalyst comprising 5% ruthenium on calcium carbonate for a period of 40 minutes. The resulting mixture is freed of catalyst by filtration. Distillation under vacuum gives a high boiling distillation residue of 1.0% and the fully saturated mixture of isomers of 4,4'-methylenedi(cyclohexylamine)

in an amount equal to a yield of 98.7% based on the amount of 4,4'-methylenedianiline introduced into the process. The product had an isomer content of 9.2% cis,cis; 42.8% cis,trans; 47.0% trans,trans.

Example 2

In a 400 cc. agitated pressure vessel, at a temperature of 225° C. and a hydrogen pressure of 5000 p.s.i.g. 100 parts of 4,4'-methylenedianiline and 50 parts dioxane are subjected to hydrogenation utilizing 10 parts of a finely divided catalyst comprising 5% ruthenium on alumina until the hydrogen uptake stops. A second hydrogenation test is made as described above substituting 10 parts of a finely divided catalyst comprising 5% ruthenium on calcium carbonate for the 5% ruthenium on alumina catalyst. The resulting product mixture from each test is freed of catalyst by filtration and distilled to strip off the solvent. Final distillation under vacuum gives the fully saturated mixture of isomers of 4,4'-methylenedi-(cyclohexylamine). The yield data comparing hydrogenations utilizing ruthenium supported on alumina and calcium carbonate in the absence of added ammonia is shown in the following table:

| Catalyst | PACM yield, percent | Deamination by-products | |
|---|---|---|---|
| | | High boiling residues,[1] percent | Low boiling amine,[2] percent |
| Ru/Al$_2$O$_3$ | 79.2 | 19.8 | 1.0 |
| Ru/CaCO$_3$ | 99.0 | 0.7 | 0.3 |

[1] Distillation residue consisting of polyamine condensation products.
[2] The low boiling amine is 4-(cyclohexylmethyl)cyclohexylamine formed by the cleavage of one amine group.

Example 3

In a 400 cc. agitated pressure vessel, at a temperature of 225° C. and a hydrogen pressure of 5000 p.s.i.g., 100 parts of 4,4'-methylenedianiline, 50 parts dioxane and 10 parts ammonia are subjected to hydrogenation utilizing 10 parts of a finely divided catalyst comprising 5% ruthenium on alumina until the hydrogen uptake stops. A second hydrogenation test is made as described above substituting 10 parts of a finely divided catalyst comprising 5% ruthenium on calcium carbonate for the 5% ruthenium on alumina catalyst. The resulting product mixture from each test is freed of catalyst by filtration and distilled to strip off the solvent. Final distillation under vacuum gives the fully saturated mixture of isomers of 4,4'-methylenedi(cyclohexylamine). The yield data comparing the hydrogenations utilizing ruthenium supported on alumina and calcium carbonate in the presence of added ammonia is shown in the following table:

| Catalyst | PACM yield, percent | Deamination by-products | |
|---|---|---|---|
| | | High boiling residues,[1] percent | Low boiling amine,[2] percent |
| Ru/Al$_2$O$_3$ | 93.4 | 4.2 | 2.4 |
| Ru/CaCO$_3$ | 97.6 | 1.9 | 0.5 |

[1] Distillation residue consisting of polyamine condensation products.
[2] The low boiling amine is 4-(cyclohexylmethyl)cyclohexylamine formed by the cleavage of one amine group.

Example 4

At a temperature of 225° C. and a hydrogen pressure of 4000 pounds per square inch gage in a suitable pressure vessel, 100 parts of 4,4'-methylenedianiline, and 500 parts dioxane are subjected to hydrogenation utilizing 10 parts of a finely divided catalyst comprising about 5% ruthenium on a support of rare earth oxide-carbonates. The mixed rare earth oxide-carbonate support has the following composition calculated on a CO$_2$ free basis and computed as oxides:

Percent
Cerium oxide _____ 62
Praseodymium oxide _____ 19
Lanthanum oxide _____ 19

The hydrogenated mixture is freed of catalyst by filtration and distilled to strip off the solvent. Final distillation under vacuum gives a distillation residue of 2.0% and the fully saturated mixture of isomers of 4,4'-methylenedi(cyclohexylamine) in an amount equal to a yield of 97.6% based on the amount of 4,4'-methylenedianiline introduced into the process. The distilled product contains more than 45% of the trans-trans-stereoisomer and is a solid at 25° C.

Example 5

At a temperature of 230° C. and a hydrogen pressure of 2500 pounds per square inch gage in a suitable pressure vessel, 150 parts of 4,4'-methylenedianiline, and 10 parts ammonia are subjected to hydrogenation utilizing 10 parts of a finely divided catalyst comprising about 5% ruthenium on a mixture of rare earth oxides. The resulting mixture is freed of catalyst by filtration and distillation under vacuum gives a residue of less than 0.6% and the fully saturated mixture of isomers of 4,4'-methylenedi(cyclohexyamine) in an amount equal to a yield of 99.3% based on the amount of 4,4'-methylenedianiline introduced into the process. The distilled product contains 45% of the trans,trans-stereoisomer and is a solid at 25° C.

Example 6

At a temperature of 245° C. and a hydrogen pressure of 3500 pounds per square inch gage in a suitable pressure vessel, 150 parts of 4,4'-methylenedianiline is subjected to hydrogenation for 20 minutes utilizing 5 parts of a finely divided catalyst comprising about 3% ruthenium on a cerium oxide support which contains about 46% of the CO$_2$ required to form cerium carbonate. The resulting mixture is freed of catalyst by filtration and distillation under vacuum gives a tarry residue of 1.8% and the fully saturated mixture of isomers of 4,4'-methylenedi(cyclohexylamine) in a yield of 97.8% based on the 4,4'-methylenedianiline used.

Example 7

At a temperature of 275° C. and a hydrogen pressure of 5000 pounds per square inch gage in a suitable pressure vessel, 100 parts of 4,4'-methylenedianiline, and 25 parts methanol are subjected to hydrogenation for 15 minutes utilizing 20 parts of a finely divided catalyst comprising 1% ruthenium on a lanthanum oxide support which contains about 60% of the CO$_2$ required to form lanthanum carbonate. The resulting mixture is freed of catalyst by filtration and distilled to strip off solvent. Final distillation under vacuum gives a good yield of the fully saturated mixture of isomers of 4,4'-methylenedi(cyclohexylamine). The distilled product contains about 45% of the trans,trans-stereoisomer and is a solid at 25° C.

Example 8

At a temperature of 295° C. and a hydrogen pressure of 1500 pounds per square inch gage in a suitable pressure vessel, 100 parts of 4,4'-methylenedianiline, and 50 parts dioxane are subjected to hydrogenation utilizing 10 parts of a finely divided catalyst comprising about 5% ruthenium on the mixed rare earth oxides. The resulting mixture is freed of catalyst by filtration and distilled to strip off solvent. Final distillation under vacuum gives a good yield of the fully saturated mixture of isomers of 4,4'-methylene-di-(cyclohexylamine).

Example 9

At a temperature of 180° C. and a hydrogen pressure of 4000 pounds per square inch gage in a suitable pressure vessel, 75 parts of 4,4'-methylenedianiline, and 25 parts dioxane are subjected to hydrogenation utilizing 10 parts of a finely divided catalyst comprising about 5% ruthenium on calcium carbonate for a period of 30 minutes. The resulting mixture is freed of catalyst by filtration and distilled to strip off solvent. Final distillation under vacuum gives a distillation residue of less than 0.8% and the fully saturated mixture of isomers of 4,4'-methylenedi-(cyclohexylamine) in an amount equal to a yield of 99.1% based on the amount of 4,4'-methylenedianiline introduced into the process.

The distilled product contains about 45% of the trans, trans-stereoisomer.

Example 10

At a temperature of 225° C. and a hydrogen pressure of 4000 pounds per square inch gage in a suitable pressure vessel, 100 parts of 4,4'-methylenedianiline, are subjected to hydrogenation utilizing 20 parts of a finely divided catalyst comprising about 3% ruthenium on calcium carbonate for a period of 30 minutes. The resulting mixture is freed of catalyst by filtration and distillation under vacuum gives a residue of 0.7% and the fully saturated mixture of isomers of 4,4'-methylenedi(cyclohexylamine) in a yield of 99.0% based on the 4,4'-methylenedianiline used.

Example 11

At a temperature of 225° C. and a hydrogen pressure of 5000 pounds per square inch gage in a suitable pressure vessel, 100 parts of 4,4'-methylenedianiline and 100 parts isopropyl ether are subjected to hydrogenation utilizing 10 parts of a finely divided catalyst comprising about 10% ruthenium on calcium carbonate for a period of 15 minutes. The resulting mixture is freed of catalyst by filtration and distilled to strip off solvent. Final distillation under vacuum gives a residue of 0.8% and the fully saturated mixture of isomers of 4,4'-methylenedi(cyclohexylamine) in an amount equal to a yield of 98.0% based on the amount of 4,4'-methylenedianiline introduced into the process. The distilled product contains more than 45% of the trans-trans-stereoisomer and is a solid at 25° C.

Example 12

At a temperature of 240° C. and a hydrogen pressure of 2500 pounds per square inch gage in a suitable pressure vessel, 150 parts of 4,4'-methylenedianiline, and 20 parts ammonia are subjected to hydrogenation utilizing 10 parts of a finely divided catalyst comprising 5% ruthenium on calcium carbonate. The resulting mixture is freed of catalyst by filtration and distillation under vacuum gives a good yield of the fully saturated mixture of isomers of 4,4'-methylenedi(cyclohexylamine).

Example 13

At a temperature of 245° C. and a hydrogen pressure of 4000 per square inch gage in a suitable pressure vessel 150 parts of 4,4'-methylenedianiline are subjected to hydrogenation utilizing 15 parts of a finely divided catalyst comprising about 5% ruthenium on calcium carbonate. The resulting mixture is freed of catalyst by filtration. Distillation under vacuum gives a residue of 1.8% and the fully saturated mixture of isomers of 4,4'-methylenedi(cyclohexylamine) in a yield of 97.8% based on the 4,4'-methylenedianiline used.

Example 14

At a temperature of 290° C. and a hydrogen pressure of 5000 pounds per square inch gage in a suitable pressure vessel, 100 parts of 4,4'-methylenedianiline, 50 parts dioxane and 25 parts ammonia are subjected to hydrogenation utilizing 10 parts of a finely divided catalyst comprising 5% ruthenium on calcium carbonate for a period of 10 minutes. The resulting mixture is freed of catalyst by filtration and distilled to strip off solvent. Final distillation under vacuum gives a good yield of the fully saturated mixture of isomers of 4,4'-methylenedi(cyclohexylamine).

Example 15

In a steel autoclave fitted with a stirring apparatus and a product draw off system such that the catalyst is retained in the reactor, there is placed 2000 parts of 4,4'-methylenedianiline and 10 parts of a finely divided catalyst comprising about 5% ruthenium on the mixed rare earth oxides. The material is heated to 225° C. with stirring and hydrogen added to maintain a pressure of 290 atmospheres. Additional 4,4'-methylenedianiline is fed at such a rate as to maintain a 60 minute resident time while product is drawn off to maintain a fixed reactor volume. The resulting product is distilled under vacuum to give a residue of 1.6% and the fully saturated mixture of isomers of 4,4'-methylenedi(cyclohexylamine) in a yield of 98.0% based on the MDA used. The distilled product contains about 48% of the trans, trans-stereoisomer.

A repeat of this example using calcium carbonate supported ruthenium gives similar results.

Example 16

At a temperature of 230° C. and a hydrogen pressure of 3000 pounds per square inch gage, in a suitable pressure vessel, 125 parts of 4,4'-methylenedianiline is subjected to hydrogenation utilizing 5 parts of a finely divided catalyst comprising 3% ruthenium on the mixed rare earth oxides, and ½ part sodium methoxide, for a period of 25 minutes. The resulting mixture is freed of catalyst by filtration and distilled under vacuum to give 0.5% of a high-boiling residue and the fully saturated mixture of stereoisomers of 4,4'-methylene-di(cyclohexylamine) in a yield of 99.3% based on the MDA used. The distilled product contains about 49% of the trans,trans-stereoisomer.

Example 17

At a temperature of 165° C. and a hydrogen pressure of 4000 pounds per square inch gage in a suitable pressure vessel, 100 parts of 4,4'-methylenedianiline, and 25 parts water are subjected to hydrogenation for a period of 40 minutes utilizing 10 parts of a finely divided catalyst comprising 5% ruthenium on calcium carbonate. The resulting mixture is freed of catalyst by filtration and distilled to strip off solvent. Final distillation under vacuum gives a good yield of the fully saturated mixture of isomers of 4,4'-methylenedi(cyclohexylamine). The trans,trans-isomer content of the product is 32%.

Example 18

At a temperature of 170° C. and a hydrogen pressure of 5000 pounds per square inch in a suitable pressure vessel, 125 parts of 4,4'-methylenedianiline is subjected to hydrogenation for 30 minutes utilizing 9 parts of a finely divided catalyst comprising 5% ruthenium on calcium carbonate and ½ part sodium methoxide. The resulting mixture is freed of catalyst by filtration and distilled under vacuum to give a residue of 1.2% and the fully saturated mixture of isomers of 4,4'-methylenedi(cyclohexylamine) in a yield of 98.5% based on the 4,4'-methylenedianiline used. The distilled product contains about 25% of the trans,trans-isomer.

Example 19

Example 18 is repeated using 4500 pounds of pressure, 150 parts of 4,4'-methylenedioniline and a reaction time of 80 minutes. The product is obtained in a yield similar to that of Example 18 and contains 35.7% of the trans, trans-isomer.

Example 20

At a temperature of 180° C. and a hydrogen pressure of 3000 pounds per square inch gage in a suitable pressure vessel, 20 parts of 4,4'-methylenedianiline, and 150 parts isopropyl ether are subjected to hydrogenation utilizing 10 parts of a finely divided catalyst comprising about 5% ruthenium on a mixture of rare earth oxide-carbonates. The rare earth oxide-carbonate support is prepared by calcining at 400° C. for 3 hours a commercially available mixture of rare earth hydroxy carbonates of the following composition calculated on a $CO_2$ free basis and computed as oxides:

| | Percent |
|---|---|
| $CeO_2$ | 47.0 |
| $La_2O_3$ | 24.5 |

| | Percent |
|---|---|
| $Nd_2O_3$ | 19.5 |
| $Pr_2O_3$ | 6.0 |
| $Sm_2O_3$ | 2.0 |
| $Gd_2O_3$ | 0.5 |
| Other rare earths | 0.5 |

The $CO_2$ content of the rare earth oxide-carbonates after calcination is about 37% of that amount which would be required to combine with all the rare earth metals as carbonates.

The hydrogenated mixture is freed of catalyst by filtration and distilled to strip off solvent. Final distillation under vacuum gives the fully saturated mixture of isomers of 4,4'-methylenedi(cyclohexylamine) in an amount equal to a yield of 99.3% based on the amount of 4,4'-methylenedianiline introduced into the process. Undesirable by-products and condensation products total less than 0.5%. The distilled product contains more than 45% of the trans,trans-stereoisomer and is a solid at 25° C.

Example 21

At a temperature of 225° C. and a hydrogen pressure of 500 pounds per square inch gage in a suitable pressure vessel, 100 parts of 4,4'-methylenedianiline, and 75 parts cyclohexane are subjected to hydrogenation utilizing 10 parts of a finely divided catalyst comprising 5% ruthenium on a mixture of rare earth oxide-carbonates.

The rare earth oxide-carbonate support is prepared by calcining at 500° C. for 3 hours a commercially available mixture of rare earth hydroxy carbonates of the following composition, calculated on a $CO_2$ free basis and computed as oxides:

| | Percent |
|---|---|
| $CeO_2$ | 47.90 |
| $La_2O_3$ | 33.90 |
| $Pr_2O_3$ | 3.90 |
| $Nd_2O_3$ | 12.90 |
| $Sm_2O_5$ | 0.60 |
| $Eu_2O_3$ | 0.15 |
| $Gd_2O_3$ | 0.30 |
| $Y_2O_3$ | 0.13 |
| $Pm_2O_3$ | |
| $Tb_2O_3$ | |
| $Dy_2O_3$ | |
| $Ho_2O_3$ | 0.22 |
| $Er_2O_3$ | |
| $Tm_2O_3$ | |
| $Yb_2O_3$ | |
| $Lu_2O_3$ | |

The $CO_2$ content of the calcined rare earth oxide-carbonates is about 21% of the theoretical amount required to form carbonates with all the metal present.

The hydrogenated mixture is freed of catalyst by filtration and distilled to strip off solvent. Final distillation under vacuum gives 1.7% of tarry residue and the fully saturated mixture of isomers of 4,4'-methylenedi(cyclohexylamine) in a yield of 98.1% based on the weight of 4,4'-methylenedianiline used. The distilled product contains about 45% of the trans,trans-stereoisomer and is a solid at 25° C.

Example 22

At a temperature of 230° C. and a total pressure of 4500 pounds per square inch gage in a suitable pressure vessel, 100 parts of 1-aminonaphthalene and 50 parts of dioxane are subjected to hydrogenation utilizing 10 parts of a finely divided catalyst comprising 5% ruthenium on calcium carbonate. The resulting mixture is freed of catalyst by filtration and distilled to strip off solvent. Final distillation under vacuum gives decahydro-1-naphthylamine in an amount equal to a yield of 96.1% based on the amount of aromatic compound introduced into the process.

Example 23

At a temperature of 280° C. and a hydrogen pressure of 2500 pounds per square inch gage in a suitable pressure vessel, 100 parts of o-toluidine and 100 parts of dioxane are subjected to hydrogenation utilizing 20 parts of a finely divided catalyst comprising about 5% ruthenium on a mixture of rare earth oxide-carbonates. The rare earth oxide-carbonate support is prepared by calcining at 400° C. for 3 hours a commercially available mixture of rare earth hydroxy carbonates of the following composition calculated as the oxides on a $CO_2$ free basis:

| | Percent |
|---|---|
| $CeO_2$ | 47.0 |
| $La_2O_3$ | 24.5 |
| $Nd_2O_3$ | 19.5 |
| $Pr_2O_3$ | 6.0 |
| $Sm_2O_3$ | 2.0 |
| $Gd_2O_3$ | 0.5 |
| Other rare earths | 0.5 |

The $CO_2$ content of the rare earth oxides after calcination is about 37% of the theoretical amount required to combine with all the rare earth metals as carbonates.

The hydrogenated mixture is freed of catalyst by filtration and distilled to strip off solvent. Final distillation under vacuum gives a good yield of 2-methyl-cyclohexylamine.

The hydrogenated mixture is freed of catalyst by filtration and distilled to strip off solvent. Final distillation under vacuum gives 2-methyl-cyclohexylamine in an amount equal to a yield of 97.1% based on the amount of aromatic compound introduced into the process.

Example 24

At a temperature of 225° C. and a hydrogen pressure of 500 pounds per square inch gage in a suitable pressure vessel, 50 parts of 4,4'-methylenedianiline are subjected to hydrogenation utilizing 15 parts of a finely divided catalyst comprising about 5% ruthenium on calcium carbonate. The resulting mixture is freed of catalyst by filtration. Final, distillation under vacuum gives 4,4'-methylenedi(cyclohexylamine).

Example 25

At a temperature of 180° C. and a total pressure of 10,000 pounds per square inch gage in a suitable pressure vessel, 100 parts of 2-ethylaniline is subjected to hydrogenation utilizing 10 parts of a finely divided catalyst comprising about 5% ruthenium on calcium carbonate for a period of 40 minutes. The resulting mixture is freed of catalyst by filtration. Final distillation under vacuum gives 2-ethylcyclohexylamine in good yield.

Example 26

At a temperature of 225° C. and a hydrogen pressure of 4500 pounds per square inch gage in a suitable pressure vessel, 100 parts of o-anisidine and 100 parts of dioxane are subjected to hydrogenation utilizing 20 parts of a finely divided catalyst of 3% by weight ruthenium on a mixture of rare earth oxide-carbonates. The rare earth oxide-carbonate support is prepared by calcining at 500° C. for 3 hours a commercially available mixture of rare earth hydroxy carbonates of the following composition calculated as the oxides on a $CO_2$ free basis:

| | Percent |
|---|---|
| $CeO_2$ | 48 |
| $La_2O_3$ | 34 |
| $Nd_2O_3$ | 13 |
| $Pr_2O_3$ | 4 |
| $Sm_2O_3$ | 0.6 |
| $Eu_2O_3$ | 0.15 |
| $Gd_2O_3$ | 0.30 |
| $Y_2O_3$ | 0.13 |

| | Percent |
|---|---|
| $Pm_2O_3$ | ⎫ |
| $Tb_2O_3$ | ⎪ |
| $Dy_2O_3$ | ⎪ |
| $Ho_2O_3$ | ⎬ 0.30 |
| $Er_2O_3$ | ⎪ |
| $Tm_2O_3$ | ⎪ |
| $Yb_2O_3$ | ⎪ |
| $Lu_2O_3$ | ⎭ |

The $CO_2$ content of rare earth oxide-carbonates after calcination is about 21% of the theoretical amount required to form carbonates with all the rare earth metals.

The hydrogenated mixture is freed of catalyst by filtration and distilled to strip off solvent. Final distillation under vacuum gives 2-methoxycyclohexylamine in good yield.

The following compounds are hydrogenated in good yields according to the procedure of Example 26 by substituting for the o-anisidine and dioxane an equivalent amount of the specified amine and solvent as set forth in the following table:

| Amine | Solvent |
|---|---|
| 2-aminopyridine | Methanol. |
| 1-aminonaphthalene | Isopropyl ether. |
| 2-aminonaphthalene | Ethanol. |
| 3,3'-dimethylbenzidine | Dioxane. |
| 2,4-bis(4-aminobenzyl)aniline | Do. |
| Benzylamine | Do. |
| 1-aminoanthracene | Do. |
| 2-aminoanthracene | Do. |
| 3-aminoquinoline | Butyl ether. |
| 2-amino-5-methylpyridine | n-Hexane. |
| 2-aminopyridine | Do. |
| 5-aminoindole | Cyclohexane. |
| 2-aminofluorene | Dioxane. |
| 4,4'-ethylenedianiline | Do. |
| 4,4'-methylenedi(1-napthylamine) | Do. |
| Aniline | Cyclohexane. |

Example 27

At a temperature of 225° C. and a total pressure of 5000 pounds per square inch gage in a suitable pressure vessel, 100 parts of benzidine and 100 parts of n-hexane are subjected to hydrogenation for 40 minutes utilizing 10 parts of a finely divided catalyst comprising 5% ruthenium on mixed rare earth oxides. The mixed rare earth oxide support has the following composition calculated as the oxides on a $CO_2$ free basis:

| | Percent |
|---|---|
| Cerium oxide | 62 |
| Praseodymium oxide | 19 |
| Lanthanum oxide | 19 |

The hydrogenated mixture is freed of catalyst by filtration and distilled to strip off solvent. Final distillation under vacuum gives dodecahydrobenzidine in an amount equal ot a yield of 95.0% based on the amount of aromatic compound introduced into the process.

Example 28

At a temperature of 225° C. and a total pressure of 4500 pounds per square inch gage in a suitable pressure vessel, 250 parts of 4,4'-methylenebis(N,N-dimethylaniline), 250 parts of dioxane, and 50 parts of ammonia are subjected to hydrogenation utilizing 10 parts of a finely divided catalyst comprising about 5% ruthenium on calcium carbonate. The resulting mixture is freed of catalyst by filtration and distilled to strip off solvent. Final distillation under vacuum gives a good yield of bis[4-(N,N-dimethylamino)cyclohexyl]methane.

Example 29

At a temperature of 200° C. and a total pressure of 4500 pounds per square inch gage in a suitable pressure vessel, 50 parts of N-methylaniline, 150 parts of dioxane, and 50 parts of ammonia are subjected to hydrogenation utilizing 10 parts of a finely divided catalyst comprising about 8% ruthenium on calcium carbonate for a period of 30 minutes. The resulting mixture is freed of catalyst by filtration. N-methylcyclohexylamine is recovered in good yield from the filtrate by distilling off the solvent.

Example 30

At a temperature of 290° C. and a total pressure of 3500 pounds per square inch gage in a suitable pressure vessel, 100 parts of 4,4'-methylenedianiline, 100 parts of n-butyl ether, and 10 parts of ammonia are subjected to hydrogenation utilizing 10 parts of a finely divided catalyst comprising about 1% ruthenium on a cerium oxide-carbonate support which contains about 46% of the $CO_2$ required to form cerium carbonate with all of the cerium. The hydrogenated mixture is freed of catalyst by filtration and distilled to strip off solvent. Final distillation under vacuum gives a good yield of 4,4'-methylenedi(cyclohexylamine).

Example 31

At a temperature of 225° C. and a total pressure of 4500 pounds per square inch gage in a suitable pressure vessel, 150 parts of N,N-dimethylaniline, 150 parts of dioxane, and 35 parts of ammonia are subjected to hydrogenation utilizing 10 parts of a finely divided catalyst comprising about 5% ruthenium on the mixed rare earth oxide-carbonates. The resulting mixture is freed of catalyst by filtration and distilled to strip off solvent. Final distillation under vacuum gives N,N-dimethylcyclohexylamine in an amount equal to a yield of 94.5% based on the amount of aromatic compound introduced into the process.

The following compounds are hydrogenated in good yields according to the procedure of Example 31 by substituting for the N,N-dimethylaniline and dioxane an equivalent amount of the amine and solvent as set forth in the following table:

| Amine | Solvent |
|---|---|
| 4,4'-methylenebis(N,N-dimethylaniline) | Dioxane. |
| N-methylaniline | Methanol. |
| o-Phenylenediamine | Cyclohexane. |
| p-Phenylenediamine | n-Hexane. |
| p-(Dimethylamino)benzylamine | Dioxane. |
| N,N'-dimethyl-p-phenylenediamine | Isopropyl ether. |
| N,N-dimethyl-m-toluidine | Ethanol. |
| N,N-dimethyl-p-toluidine | Do. |
| N-ethylaniline | Butyl ether. |
| N-ethyl-N-phenylbenzylamine | Dioxane. |

Example 32

At a temperature of 220° C. and a total pressure of 4500 pounds per square inch gage in a suitable pressure vessel, 100 parts of m-phenylenediamine, 100 parts of dioxane and 25 parts of ammonia are subjected to hydrogenation utilizing 10 parts of a finely divided catalyst comprising about 5% ruthenium on a lanthanum oxide-carbonate support which contains 60% of the $CO_2$ required to form lanthanum carbonate with all of the lanthanum. The hydrogenated mixture is freed of catalyst by filtration and distilled to strip off solvent. Final distillation under vacuum gives 1,3-diaminocyclohexane in an amount equal to a yield of 94.1% based on the amount of aromatic compound introduced into the process.

The following compounds are hydrogenated in good yields according to the procedure of Example 32 by substituting for the m-phenylenediamine an equivalent amount of the amines set forth in the following list:

N-ethyl-N-methylaniline
N-ethyl-1-aminonaphthalene
N-ethyl-o-toluidine

N-ethyl-m-toluidine
N-ethyl-N-benzyl-m-toluidine
N-phenylbenzylamine
N-phenyl-1-aminonaphthalene
N-phenyl-2-aminonaphthalene
N-phenyl-p-phenylenediamine
N,N,N',N'-tetramethylbenzidine
4-methoxy-o-phenylenediamine
2-aminopyridine
2,6-diaminopyridine
2,7-diaminofluorene
4,4'-methylenebis(o-phenylenediamine)
4,4'-methylenebis(o-toluidine)
4,4'-methylenedi(1-naphthylamine)
4,4'-methylenedi(m-anisidine)

Example 33

At a temperature of 225° C. and a total pressure of 4500 pounds per square inch gage in a suitable pressure vessel, 100 parts of N-isopropylaniline, 100 parts of dioxane, and 25 parts of ammonia are subjected to hydrogenation utilizing 10 parts of a finely divided catalyst comprising about 5% ruthenium on calcium carbonate. The resulting mixture is freed of catalyst by filtration and distilled to strip off solvent. Final distillation under vacuum gives N-isopropylcyclohexylamine in good yield.

The following compounds are hydrogenated in good yields according to the procedures of Example 33 by substituting an equivalent amount of each amine and solvent of the table below for the N-isopropylaniline and dioxane of Example 33.

| Amine | Solvent |
|---|---|
| N-decyl-1-aminonaphthalene | Isopropyl ether. |
| 4,4'-methylene bis(N-ethylaniline) | Butyl ether. |
| 4,4'-methylene bis(N-ethyl-o-toluidine) | Do. |
| N-methyl-1-aminonaphthalene | Isopropyl ether. |

We claim:

1. A process for hydrogenating to the corresponding saturated compound an aromatic nitrogen-containing compound represented by the following formulae:

(I) 

(II) 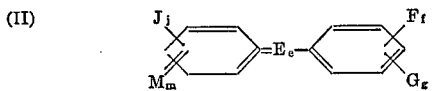

(III) 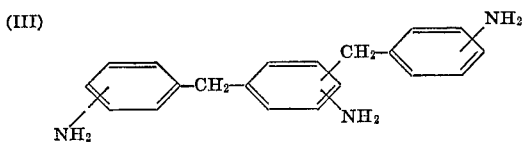

and (IV) 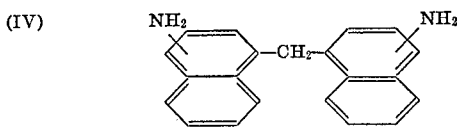

wherein:
R is benzene, naphthalene, anthracene, or fluorene;
A is

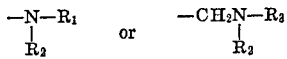

B is —$NH_2$, alkyl having 1 to 12 carbon atoms, or alkoxy having 1 to 5 carbon atoms;
D is alkyl having 1 to 12 carbon atoms, —$NH_2$, alkoxy having 1 to 5 carbon atoms, or —OH;
E is —$CH_2$—, —$CH_2CH_2$—, or —O—;

F is $$-\underset{R_5}{\underset{|}{N}}-R_4$$

or —$CH_2NH_2$;
G is —$NH_2$ or alkyl having 1 to 12 carbon atoms;
J is $$-\underset{R_7}{\underset{|}{N}}-R_6$$

or —$CH_2NH_2$;
M is —$NH_2$ or alkyl having 1 to 12 carbon atoms;
$R_1$ is hydrogen or alkyl having 1 to 12 carbon atoms;
$R_2$ is hydrogen, alkyl having 1 to 12 carbon atoms, benzyl cyclohexyl, or phenyl;
$R_3$ is hydrogen or alkyl having 1 to 12 carbon atoms;
$R_4$, $R_5$, $R_6$ and $R_7$ are the same or different and are selected from hydrogen or alkyl having 1 to 12 carbon atoms;
$a$ is an integer selected from 1 or 2, with the proviso that when $a$ is 2, the A groups may be the same or different; and
$b$, $d$, $e$, $f$, $g$, $j$, and $m$ are the same or different and are integers selected from 0 or 1 with the proviso that at least one of $f$, $g$, $j$, or $m$ be 1;
with the provisos that:
(1) compounds having Formula I can contain no more than 30 carbon atoms and
(2) compounds having Formula II can contain no more than 36 carbon atoms;
comprising admixing said compound with hydrogen at a hydrogen partial pressure of at least 200 p.s.i., a total pressure of from 200 p.s.i. to 15,000 p.s.i., a temperature in the range of from 100° C. to 300° C., in the presence of from 0% to 200%, based on the weight of said compound to be hydrogenated, of added ammonia, and in the presence of from 0.001% to 10% by weight, based on said compound to be hydrogenated and calculated as metallic ruthenium, of a ruthenium catalyst supported on an inert carrier selected from the group consisting of calcium carbonate, rare earth oxides, rare earth carbonates, mixed rare earth oxide-carbonates, and mixtures thereof.

2. The process of claim 1 wherein said compound is o, m, or p-phenylenediamine.

3. The process of claim 1 wherein said compound is o, m, or p-toluidine.

4. The process of claim 1 wherein said inert carrier is calcium carbonate.

5. The process of claim 1 wherein said catalyst is present in an amount ranging from 0.01% to 1.0%.

6. The process of claim 1 wherein said compound is represented by the following formulae:

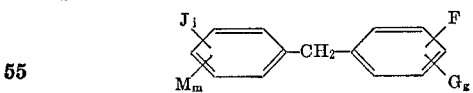

and

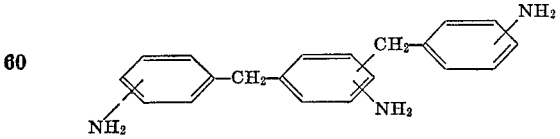

7. The process of claim 6 wherein said inert support is calcium carbonate.

8. The process of claim 6 wherein said catalyst is present in an amount ranging from 0.01% to 1.0%.

9. The process of claim 1 wherein said compound is benzidine.

10. The process of claim 6 wherein said compound is 2,4-bis(4-aminobenzyl)aniline.

11. The porcess of claim 6 wherein said compound is 4,4'-methylenedianiline.

12. The process of claim 11 wherein said inert support is calcium carbonate.

13. The process of claim 11 wherein said catalyst is present in amounts ranging from 0.01% to 1.0%.

References Cited

UNITED STATES PATENTS

| | | | |
|---|---|---|---|
| 2,606,925 | 8/1952 | Whitman | 260—563 |
| 2,606,926 | 8/1952 | Kirby | 260—563 |
| 2,606,928 | 8/1952 | Barkdoll et al. | 260—563 |
| 2,822,392 | 2/1958 | Illich et al. | 260—563 |
| 2,930,765 | 3/1960 | Cooper et al. | 252—473 |
| 2,930,766 | 3/1960 | Lacey | 252—473 |
| 3,155,724 | 11/1964 | Arthur | 260—563 |
| 3,193,584 | 7/1965 | Rylander et al. | 260—611 |
| 3,347,915 | 10/1967 | Arthur | 260—563 |

CHARLES B. PARKER, Primary Examiner

D. R. PHILLIPS, Assistant Examiner

U.S. Cl. X.R.

260—283 R, 288 R, 293.2, 319.1, 326.1 S

UNITED STATES PATENT OFFICE
CERTIFICATE OF CORRECTION

Patent No. 3,644,522    Dated Feb. 22, 1972

Inventor(s) Loren D. Brake and Alvin B. Stiles

It is certified that error appears in the above-identified patent and that said Letters Patent are hereby corrected as shown below:

Column 17, Formula II, that portion of the formula reading

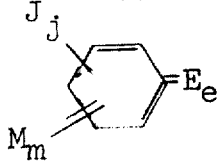   should read   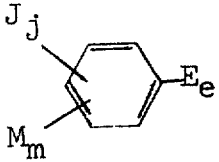

Column 18, Claim 6, first formula, that portion reading

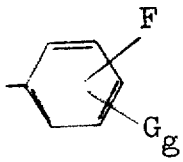   should read   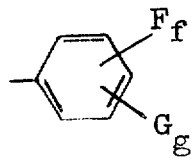

Signed and sealed this 25th day of July 1972.

(SEAL)
Attest:

EDWARD M. FLETCHER, JR.        ROBERT GOTTSCHALK
Attesting Officer              Commissioner of Patents